US010059610B2

(12) United States Patent
Bakke et al.

(10) Patent No.: US 10,059,610 B2
(45) Date of Patent: Aug. 28, 2018

(54) REDUCTION OF THE AMOUNT OF SULPHUR COMPOUNDS IN A SULPHUR COMPOUNDS CONTAMINATED WASTEWATER STREAM USING A GRANULAR SLUDGE TREATMENT SYSTEM

(71) Applicant: YARA INTERNATIONAL ASA, Oslo (NO)

(72) Inventors: Rune Bakke, Skien (NO); Carlos Antonio Saldias Dinamarca, Stathelle (NO); Wolfram Franke, Porsgrunn (NO)

(73) Assignee: Yara International ASA, Oslo (NO)

( * ) Notice: Subject to any disclaimer, the term of this patent is extended or adjusted under 35 U.S.C. 154(b) by 153 days.

(21) Appl. No.: 15/116,237

(22) PCT Filed: Feb. 5, 2015

(86) PCT No.: PCT/EP2015/052374
§ 371 (c)(1),
(2) Date: Aug. 3, 2016

(87) PCT Pub. No.: WO2015/118048
PCT Pub. Date: Aug. 13, 2015

(65) Prior Publication Data
US 2017/0073259 A1 Mar. 16, 2017

(30) Foreign Application Priority Data
Feb. 5, 2014 (NO) .................................. 20140141

(51) Int. Cl.
*C02F 3/34* (2006.01)
*C02F 3/00* (2006.01)
(Continued)

(52) U.S. Cl.
CPC .............. *C02F 3/345* (2013.01); *C02F 3/006* (2013.01); *C02F 3/2846* (2013.01);
(Continued)

(58) Field of Classification Search
CPC ......... C02F 3/345; C02F 3/006; C02F 3/2846
See application file for complete search history.

(56) References Cited

U.S. PATENT DOCUMENTS 4,460,692 A 7/1984 Tellier et al.
5,603,832 A 2/1997 Høyvik et al.
(Continued)

FOREIGN PATENT DOCUMENTS

| CN | 102 923 853 A | 2/2013 |
| EP | 2 669 255 A1 | 12/2013 |
| WO | 2012071793 A1 | 6/2012 |

OTHER PUBLICATIONS

PCT International Search Report and Written Opinion dated Jun. 29, 2015 for PCT International Patent Application No. PCT/EP2015/052374, 10 pages.
(Continued)

*Primary Examiner* — Chester T Barry
(74) *Attorney, Agent, or Firm* — Amster, Rothstein & Ebenstein LLP

(57) ABSTRACT

The invention relates to a process for reducing the amount of sulphur compounds in a sulphur compounds contaminated wastewater stream, using a granular sludge treatment system (10) comprising anaerobic microorganisms, wherein the process comprises the steps of adding an aqueous nitrate solution to the wastewater stream, contacting the wastewater stream with the anaerobic microorganisms, and anoxic oxidation of at least part of the sulphur compounds in the sulphur compounds contaminated wastewater stream by the anaerobic microorganisms, resulting in a sulphur com-
(Continued)

pounds depleted wastewater stream. The invention furthermore relates to such a granular sludge treatment system (10).

13 Claims, 1 Drawing Sheet

(51) Int. Cl.
*C02F 3/28* (2006.01)
*C02F 101/10* (2006.01)
*C02F 103/36* (2006.01)

(52) U.S. Cl.
CPC .. *C02F 2101/101* (2013.01); *C02F 2103/365* (2013.01); *C02F 2209/001* (2013.01); *C02F 2209/003* (2013.01); *C02F 2209/26* (2013.01); *C02F 2305/06* (2013.01)

(56) References Cited

U.S. PATENT DOCUMENTS

| | | | |
|---|---|---|---|
| 6,059,973 A | 5/2000 | Hudson et al. | |
| 7,326,340 B2* | 2/2008 | Harshman | C02F 1/008 210/198.1 |
| 7,514,058 B1 | 4/2009 | Hitzman et al. | |
| 2012/0067820 A1* | 3/2012 | Henthorne | B01D 61/02 210/641 |
| 2012/0213662 A1* | 8/2012 | Matheis | C02F 1/70 422/5 |
| 2013/0256223 A1 | 10/2013 | Chen et al. | |

OTHER PUBLICATIONS

Notification of Transmittal of the International Preliminary Report on Patentability dated Jun. 6, 2016 for PCT International Patent Application No. PCT/EP2015/052374, 17 pages.

Norwegian Search Report dated Aug. 21, 2014 in connection with Norwegian Patent Application No. 20140141, 2 pages.

Chen C et al., entitled "Enhanced performance of denitrifying sulfide removal process under mirco-aerobic condition," Journal of Hazardous Materials 179 (2010) 1147-1151.

Beristain-Cardoso R et al., entitled Sulfide and ammonium oxidation, acetate mineralization by denitrification in a multipurpose UASB reactor, Bioresource Technology 102 (2011) 2549-2554.

Zhou X et al., entitled "Rapid acclimation of methanogenic granular sludge into denitrifying sulfide removal granules," Bioresource Technology 102 (2011) 5244-5247.

\* cited by examiner

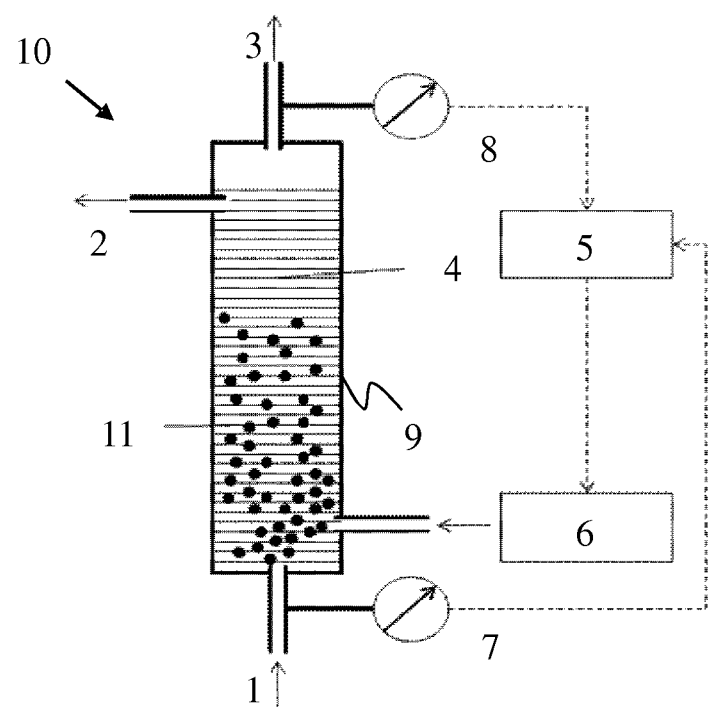

REDUCTION OF THE AMOUNT OF SULPHUR COMPOUNDS IN A SULPHUR COMPOUNDS CONTAMINATED WASTEWATER STREAM USING A GRANULAR SLUDGE TREATMENT SYSTEM

CROSS-REFERENCE TO RELATED APPLICATIONS

This application is a U.S. national stage entry under 35 U.S.C. § 371 of PCT International Patent Application No. PCT/EP2015/052374, filed Feb. 5, 2015, which claims priority to Norwegian Patent Application No. 20140141, filed Feb. 5, 2014, the contents of which are incorporated herein by reference in their entirety.

FIELD OF THE INVENTION

The invention relates to a granular sludge treatment process for reducing the amount of sulphur compounds in a sulphur compounds contaminated wastewater stream by removing and degrading the sulphur compounds from the sulphur compounds containing wastewater stream. The sulphur compounds more specifically are inorganic sulphur compounds, and most specifically hydrogen sulphide ($H_2S$). The wastewater stream more particularly is an industrial wastewater stream, and most particularly a wastewater stream from the petrochemical industry. In the process, a granular sludge treatment system is used having anaerobic microorganisms. The process according to the invention comprises the steps of contacting the sulphur compounds contaminated wastewater stream with the anaerobic microorganisms and oxidation of at least part of the sulphur compounds in the sulphur compounds contaminated wastewater stream by the anaerobic microorganisms, resulting in a sulphur compounds depleted wastewater stream.

The invention furthermore relates to a granular sludge treatment system arranged to reduce the amount of sulphur compounds in a sulphur compounds contaminated wastewater stream. The granular sludge treatment system comprises anaerobic microorganisms that are capable of oxidizing the sulphur compounds. These anaerobic microorganisms are arranged to be contacted with the sulphur compounds in the sulphur compounds contaminated wastewater stream and to oxidize at least part of the sulphur compounds in the sulphur compounds contaminated wastewater stream, resulting in a sulphur compounds depleted wastewater stream.

The invention finally relates to the use of a granular sludge treatment system according to the invention and as described above, for reducing the amount of sulphur compounds in a sulphur compounds contaminated wastewater stream.

BACKGROUND OF THE INVENTION

Sulphur compounds are naturally present in wastewater, more in particular industrial wastewater. There are many problems linked to the presence of sulphur compounds in wastewater, such as:
- the emission of nauseating odours (rotten egg type). These unpleasant odours are detected well before they represent a danger to human beings since the olfactory sensors have a detection threshold at 0.15 ppm.
- the health risks related to hydrogen sulphide. In fact, this molecule is toxic starting from 10 ppm, with worsening of the effects according to the duration of exposure.
- corrosion of concrete and metals due to oxidation of sulphides to sulphuric acid by certain bacteria of the *Thiobacillus* type.
- the development of filamentous bacteria. Since the water is septic, filamentous bacteria are more competitive than the conventional bacteria of the flock with respect to oxygen. Some are capable of accumulating sulphur in the form of granules in their cells.
- the need to cover the works in order to prevent dispersion of hydrogen sulphide.

The treatment of industrial wastewater, with a focus on removal of sulphide compounds, can be done chemically, biochemically, as well as biologically.

Established chemical processes are precipitation with iron salt and oxidation with oxidizers like hydrogen peroxide. The disadvantage of precipitation with iron salt is that the solids need to be separated, while the disadvantage of using oxidizers is that these are expensive and partly hazardous to handle.

Examples of biochemical processes for the treatment of wastewater include biochemical treatment in anoxic basins and biochemical solid bed processes. The disadvantage of using anoxic basins is that they take in a large volume as the sludge comes in as a suspension. For that reason, such systems using anoxic basins are expensive to build. The disadvantage of biochemical solid bed processes is that over time, clogging occurs.

Today, there is however the tendency to choose for biological wastewater treatment using microorganisms, mostly including bacteria and protozoa. Typically, the wastewater is mixed with activated sludge on which special types of microorganisms are cultivated. The term "activated" means that there is biological activity. Mostly, the sludge needs to be pushed with an inoculum injection in the beginning to produce the correct microbiology. The microorganisms are able to decompose the pollutants present in the wastewater and convert them into biomass.

At present, aerobic as well as anaerobic sludge systems are known. Anaerobic processes convert soluble organic carbon into carbon dioxide and methane (=one of the main components of biogas), in contrast to aerobic systems, which only produce carbon dioxide.

In aerobic sludge systems, air or oxygen is introduced into a mixture of screened, and primary treated wastewater combined with microorganisms to develop a biological flocculation which is able to degrade certain undesired compounds in the wastewater. To maintain aerobic conditions and to the keep the active biomass suspended, a constant and well-timed supply of oxygen is required. Also, the oxidation of sulphide to sulphur or sulphate by injection of air demands sufficient oxygen uptake of the wastewater sludge. Due to the low solubility of oxygen in water, the oxidation capacity and thus the room specific performance (=removal of sulphide per $m^3$ reactor) is low. In addition, the nitrogen in air leads to stripping of sulphide and thus increased emissions of non-oxidized sulphide. Consequently, air based oxidation processes for removal of sulphide have strong limitations.

Over the past several years, anaerobic methods have been increasingly used for treatment of amongst others industrial wastewater to remove suspended and soluble organic matter from these aqueous wastewater streams. Anaerobic activated sludge systems use anaerobic microorganisms that treat wastewater in the absence of oxygen. The term "anaerobic" thus refers to the bacterial metabolism that occurs in the absence of oxygen. If anaerobic processes are correctly controlled, they can lead to a high level of purification of wastewater.

Significant disadvantages of aerobic wastewater treatment processes over anaerobic wastewater treatment processes are that aerobic processes require large amounts of oxygen and larger volumes for oxygen transfer, through which the aerobic wastewater treatment systems are less cost effective.

Other advantages of anaerobic wastewater treatment processes over aerobic wastewater treatment processes are the following:

during the anaerobic treatment process, an amount of valuable biogas energy will be produced which can be collected for other usage;
much less bio-solids waste generated compared with aerobic process because much of the energy in the wastewater is converted to a gaseous form and resulting in very little energy left for new cell growth;
a low energy requirement for the anaerobic treatment process;
less nutrients are required;
anaerobic wastewater treatment systems can be shut down for extended periods without serious deterioration; and
the anaerobic wastewater treatment process can handle organic shock loads effectively.

Amongst sludge treatment systems, suspended sludge as well as granular sludge treatment systems are known.

Granular sludge treatment systems comprise a bioreactor containing sludge granules. These sludge granules are aggregates of microorganisms that are formed during wastewater treatment in an environment with a constant flow hydraulic regime. In the absence of any support matrix, the flow conditions create a selective environment in which only those microorganisms, capable of attaching to each other, survive and proliferate. Finally, the aggregates form into dense compact biofilms referred to as granules. Due to their large particle size, generally ranging from 0.5 to 2 mm, the granules resist washout from the reactor, permitting high hydraulic loads.

Likewise granular sludge treatment systems, suspended sludge treatment systems also use microorganisms. However, in the suspended sludge treatment systems, these microorganisms form rather small flakes in the wastewater or sludge, through which a suspension is formed in the wastewater. The microorganisms and the wastewater thus form a slurry. Granular sludge treatment systems provide an increased biological activity compared to suspended sludge treatment systems due to giving more protection for the microorganisms in the granules. The granular sludge treatment system furthermore provides a far easier separation of the sludge and the liquid phase and after the wastewater has been treated.

Up-flow Anaerobic Sludge Blanket (UASB) digestion reactors are known for stable and efficient anaerobic degradation and biogas production with a high concentration of methane which is formed as a by-product. UASB digestion reactors use an anaerobic process whilst forming a blanket of granular sludge which suspends in the reactor. Wastewater flows upwards through the blanket and is processed (degraded) by anaerobic microorganisms. The upward flow combined with the settling action of gravity suspends the blanket with the aid of flocculants. The blanket begins to reach maturity at around 3 months. Small sludge granules begin to form whose surface area is covered in aggregations of microorganisms. In the absence of any support matrix, the flow conditions creates a selective environment in which only those microorganisms, capable of attaching to each other, survive and proliferate. Eventually, the aggregates form into dense compact biofilms referred to as "granules". Generally, during the treatment of UASB reactor, the substrate passes through an expanded sludge bed which containing a high concentration of biomass first. After that, the remaining part of substrate passes through a less dense biomass which named the sludge blanket. The UASB digestion-technology needs constant monitoring when put into use to ensure that the sludge blanket is maintained, and not washed out (thereby losing the effect). An example of such an UASB reactor is described in amongst others EP 2669255 and WO 2007/048537.

A known variant of the UASB concept for anaerobic wastewater treatment is an expanded granular sludge bed (EGSB) reactor. Both the UASB reactor and the EGSB reactor make use of granules, but differ in term of geometry, process parameters and applications. The distinguishing feature between the EGSB reactor and the UASB reactor is that a faster rate of upward-flow velocity is designed for the wastewater passing through the sludge bed. This increased flux permits partial expansion (fluidisation) of the granular sludge bed, improving wastewater-sludge contact as well as enhancing segregation of small inactive suspended particles from the sludge bed.

A down-flow alternative for the UASB and the EGSB reactor is a static granular bed reactor (SGBR). The SGBR includes a fixed bed of anaerobic granules in a down-flow configuration without flow recirculation. An example of such an SGBR is described in U.S. Pat. No. 6,709,591. The SGBR uses a down-flow bioreactor that is filled with active anaerobic granular biomass. Influent wastewater is distributed evenly across the bioreactor and passes downward through the granules. The gas that is produced by the granules provides channelization of the bed to prevent clogging. Clogging may also be prevented by recirculation of the gas or effluent to dislodge any trapped granules.

Because of the advantages as mentioned above, the invention relates to an anaerobic granular sludge treatment system for treatment of wastewater, focused to be used for the reduction of sulphur compounds in sulphur compound contaminated wastewater streams.

In the use of anaerobic granular sludge treatment systems, there exists the need to provide an anaerobic granular sludge treatment system that provides in a better recovery of the elemental sulphur or sulphate obtained by the oxidation of the sulphur compounds in the wastewater stream without disturbing the biological part of it.

SUMMARY OF THE INVENTION

According to a first aspect of the invention, a process is disclosed for reducing the amount of sulphur compounds in a sulphur compounds contaminated wastewater stream, using a granular sludge treatment system comprising anaerobic microorganisms, wherein the process comprises the steps of contacting the sulphur compounds contaminated wastewater stream with the anaerobic microorganisms; and
oxidation of at least part of the sulphur compounds in the sulphur compounds contaminated wastewater stream by the anaerobic microorganisms, resulting in a sulphur compounds depleted wastewater stream, wherein the process further comprises the step of adding an aqueous nitrate solution to the sulphur compounds contaminated wastewater stream prior to being contacted with the anaerobic microorganisms, enabling the anaerobic microorganisms to oxidize the sulphur compounds without the presence of oxygen.

The added aqueous nitrate solutions is an electron acceptor for the oxidation of the sulphur compounds in the sulphur compounds contaminated wastewater, as well as a nitrogen source forming part of the nutrients for the anaerobe microorganisms.

By adding this nitrate solution, a purely anaerobic granular sludge treatment process is made anoxic. Normally, in purely anaerobic granular sludge treatment processes, the remaining nitrate from previous treatment steps of wastewater is removed using an oxidizer such as carbon which is added or still present in the wastewater. The microorganisms consume the nitrate in the wastewater, this process being called denitrification. In the granular sludge treatment process according to the invention, which allows oxidation of the sulphur compounds in anoxic conditions, the microorganisms will use the nitrate as an electron acceptor and release nitrogen in the form of nitrogen gas or nitrogen oxides. The nitrate source is used as the oxidizer in order to convert the sulphur compounds in the wastewater into elemental sulphur or sulphates.

Furthermore, by making the granular sludge treatment process anoxic, the biological community generated by the process according to the invention is able to stand both anoxic and anaerobic conditions. This is very useful for the process according to the invention in case the nitrate supply has to be restarted after it was stopped.

By adding the nitrate solution to oxidize the sulphur compounds in the sulphur compounds contaminated wastewater, there is no limitation upon the amount of organics needed for the oxidation of the sulphur compounds in the sulphur compounds contaminated wastewater. Consequently, there is a sufficient supply of electron acceptor source which can be maintained.

A first benefit of applying a granular sludge treatment process in combination with an aqueous nitrate solution in view of known suspended sludge treatment processes is that the sludge of the granular sludge treatment process is more compact. A further benefit is that there is an increased biological activity compared to suspended sludge systems due to the fact that more protection for the microorganisms is given in the granule.

In view of known solid bed filters, no clogging occurs by applying the process according to the invention. Furthermore, there is increased biological activity compared to the solid bed system due to avoiding carrier material.

A further benefit is that there is no precipitation of iron sulphides that can block filters downstream, which occurs when the effluent water is treated with a filter unit, like a sand filter bed, to keep back particles. Those filters tend to clog quickly at the presence of fines mineral particles like Iron sulphide (FeS).

In an advantageous embodiment of a process according to the invention, the aqueous nitrate solution is chosen from an ammonium, calcium, potassium or sodium nitrate solution or any combination thereof.

Since microbial activity of the anaerobic microorganisms demands nutrients, and (industrial) wastewater usually lacks nutrients, these nutrients have to be added separately. Therefore, in a favourable embodiment of a process according to the invention, the process comprises the step of adding an aqueous nutrient solution to the wastewater stream, the aqueous nutrient solution comprising the aqueous nitrate solution as a nitrogen source.

The aqueous nutrient solution can also comprise a phosphor source. The phosphor source preferably is an aqueous phosphoric acid solution.

Usually, industrial waste water is lacking nitrogen as well as phosphor compounds. However, there are systems where only an N-source is added.

In a favourable embodiment of a process according to the invention, the process comprises the step of automatically adjusting the dosage of the nutrients solution added to the wastewater stream in relation to the sulphur compound content in the sulphur compounds contaminated wastewater stream at an inlet of the granular sludge treatment system.

The sulphur compounds more specifically comprise hydrogen sulphide ($H_2S$).

According to a further aspect of the invention, a granular sludge treatment system is provided that is arranged to reduce the amount of sulphur compounds in a sulphur compounds contaminated wastewater stream, the granular sludge treatment system comprising anaerobic microorganisms capable of oxidizing the sulphur compounds, these anaerobic microorganisms being arranged to be contacted with the sulphur compounds and being arranged to oxidize at least part of the sulphur compounds in the sulphur compounds contaminated wastewater stream, resulting in a sulphur compounds depleted wastewater stream, wherein the anaerobic granular sludge treatment system comprises a dosage system for adding an aqueous nitrate solution to the sulphur compounds contaminated wastewater stream before being contacted with the anaerobic microorganisms, enabling the anaerobic microorganisms to oxidize the sulphur compounds without the presence of oxygen.

In a preferred embodiment of a granular sludge treatment system according to the invention, the dosage system is arranged to add an aqueous nutrient solution to the wastewater stream, the aqueous nutrient solution comprising the aqueous nitrate solution as a nitrogen source The nutrient solution preferably also comprises a phosphor source, more preferably an aqueous phosphoric acid solution.

In a more preferred embodiment of a granular sludge treatment system according to the invention, the granular sludge treatment system comprises a controller that is arranged to
  monitor one or more signals from loads of sulphur compounds at an inlet of a granular sludge reactor forming part of the granular sludge treatment system;
  calculate the demand of the nitrogen and/or the phosphor source in the nutrient solution for the anaerobic microorganisms; and
  adjust the dosage of the nitrogen and/or the phosphor source in the nutrient solution based on the demand of the nitrogen and/or the phosphor source equalling to a ratio of sulphur compound, nitrogen and phosphor source of 20:10:1.

In a possible embodiment of a granular sludge treatment system according to the invention, the controller is arranged to simultaneously adapt the dosage of the nitrogen and the phosphor source in the nutrient solution.

In another possible embodiment of a granular sludge treatment system according to the invention, the controller is arranged to adapt the dosage of the nitrogen and the phosphor source in the nutrient solution separately.

In a favourable embodiment of an anaerobic granular sludge treatment system according to the invention, the granular sludge treatment system is arranged to perform a process according to the invention as described above.

In another aspect of the invention the system and the method the amount nitrate added to the amount of sulphide present in the wastewater to be treated is approximately 1:2 by weight.

In a further aspect of the invention the system and the method are able to remove more than 99 wt % preferably more than 99.5 wt % of the sulphide present in a wastewater stream comprising 250 g $S^{2-}/m^3/h$.

According to a final aspect of the invention, the use of a granular sludge treatment system according to the invention as described above is disclosed, for reducing the amount of sulphur compounds in a sulphur compounds contaminated wastewater stream.

BRIEF DESCRIPTION OF THE FIGURES

FIG. 1 shows a scheme of a granular sludge reactor according to the invention

DETAILED DESCRIPTION OF THE INVENTION

The process according to the invention for removing sulphur compounds, more specifically inorganic sulphur compounds and most specifically hydrogen sulphide ($H_2S$), out of a sulphur compound contaminated wastewater stream, more specifically industrial wastewater, and most specifically a wastewater stream from the petrochemical industry, uses a granular sludge treatment system 10 comprising anaerobic microorganisms that are able to, without the presence of oxygen, oxidize the sulphur compounds using an aqueous nitrate solution as the source of nitrate serving as the electron acceptor for the oxidation of the sulphur compounds into elemental sulphur and/or sulphates. It is herewith remarked that the exact type of microorganisms is not critical to the invention, as long as these anaerobic microorganisms are able to use the nitrate source to oxidize the sulphur compounds.

The process according to the invention comprises the steps of
    adding an aqueous nitrate solution to the sulphur compounds contaminated wastewater stream;
    contacting the sulphur compounds contaminated wastewater stream with the anaerobic microorganisms; and
    anoxic oxidation of at least part of the sulphur compounds in the sulphur compounds contaminated wastewater stream by the anaerobic microorganisms, resulting in a sulphur compounds depleted wastewater stream.

The aqueous nitrate solution is chosen from an ammonium, calcium, potassium or sodium nitrate solution or any combination thereof.

The process according to the invention also comprises the step of adding an aqueous nutrient solution to the wastewater stream for the anaerobic microorganisms. The aqueous nutrient solution that is added to the wastewater stream as an electron acceptor for anoxic oxidation of the sulphur compounds in the wastewater stream, also serves as a nitrogen source for the anaerobic microorganisms. In wastewater conditions for anoxic oxidation of for instance $H_2S$, about 2 g $NO_3^-$ is needed to oxidize 1 g $H_2S$. The nutrient solution furthermore preferably comprises a phosphor source, more preferably in the form of an aqueous phosphoric acid solution.

The process preferably comprises the step of automatically adjusting the dosage of the nutrients solution added to the wastewater stream in relation to the sulphur compound content in the sulphur compounds contaminated wastewater stream at an inlet of the granular sludge treatment system 10. In order to enable this automatic adjustment of the dosage of the nutrients solution as mentioned before, the granular sludge treatment system 10 comprises a controller that is arranged to monitor one or more signals from loads of sulphur compounds at an inlet 1 of the granular sludge reactor 11;
    calculate the demand of the nitrogen and/or the phosphor source in the nutrient solution for the anaerobic microorganisms; and
    adjust the dosage of the nitrogen and/or the phosphor source in the nutrient solution based on the demand of the nitrogen and/or the phosphor source equalling to a ratio of sulphur compound, nitrogen and phosphor source of 20:10:1 based on the weight.

The controller can be arranged either to simultaneously adapt the dosage of the nitrogen and the phosphor source in the nutrient solution, either to adapt the dosage of the nitrogen and the phosphor source in the nutrient solution separately.

The invention is herewith illustrated with the scheme as shown in FIG. 1 which illustrates a non-limiting exemplary embodiment of a granular sludge treatment system for reducing the amount of hydrogen sulphide out of a hydrogen sulphide contaminated wastewater according to the invention.

The wastewater enters the granular sludge reactor 11 at the inlet 1 thereof, where the flow volume stream is preferably measured by a supersonic probe 7 and the temperature is preferably measured by an industrial sensor such as a PT-100. The treated wastewater then leaves the granular sludge reactor 11 at the effluent 2. The produced off-gas leaves the granular sludge reactor 11 at the headspace 3. The off-gas can contain some methane, but mostly $CO_2$, so it will be released to the atmosphere without further use.

In the granular sludge reactor 11, granular sludge 9 in water 4 is present. The granular sludge 9 consists of aggregates of anaerobic microorganisms (without using carrier material). The microorganisms oxidize hydrogen sulphide, in the wastewater without the presence of oxygen using an aqueous nitrate solution. This aqueous nitrate solution forms part of the nutrient solution for the microorganisms. The supply of the nitrate solution is calculated and controlled by a controller 5. This calculation is based on the inlet flow that is measured by the supersonic probe 7 and the remaining concentration of the hydrogen sulphide, as preferably measured by an industrial metal oxide sensor 8. The nitrate solution is applied via a dosage system 5 to the granular sludge reactor 11. Also the aqueous phosphoric acid is preferably applied by this dosage system 5. They can be applied simultaneously or separately. Also the supply of the amount of aqueous phosphoric acid is preferably calculated and controlled by the controller 5.

EXAMPLE

A laboratory scale setup of a granular sludge treatment system according to the invention was loaded with sulphide concentrations up to 500 g $S^{2-}/m^3/h$. The amount of aqueous nitrate solution added was controlled to be sufficient to act as an electron acceptor for the oxidation of the sulphide in the treated wastewater. The ratio $S^{2-}$:N based on weight was kept at approximately 2:1.

TABLE 1

| Sulphide Load [g $S^{2-}$/m³/h] | Retention Time [h] | Initial Sulphide concentration [mg/L] | Removal Efficiency [%] |
| --- | --- | --- | --- |
| 21 | 12 | 313 | 99.56 |
| 42 | 12 | 625 | 99.36 |
| 167 | 12 | 2500 | 99.99 |
| 250 | 12 | 3750 | 99.95 |
| 500 | 6 | 3750 | 25.07 |

Out of table 1, it can be seen that up to 250 g $S^{2-}$, the removal efficiency was satisfying.

The invention claimed is:

1. Process for reducing the amount of sulphur compounds in a sulphur compounds contaminated wastewater stream, using a granular sludge treatment system (10) comprising anaerobic microorganisms, wherein the process comprises the steps of contacting the sulphur compounds contaminated wastewater stream with the anaerobic microorganisms; and oxidation of at least part of the sulphur compounds in the sulphur compounds contaminated wastewater stream by the anaerobic microorganisms, CHARACTERIZED IN THAT the process further comprises the step of adding an aqueous nitrate solution to the sulphur compounds contaminated wastewater stream prior to being contacted with the anaerobic microorganisms, enabling the anaerobic microorganisms to oxidize the sulphur compounds without the presence of oxygen; and IN THAT the aqueous nutrient solution comprises a phosphorous source.

2. The process according to claim 1, wherein the aqueous nitrate solution is chosen from an ammonium, calcium, potassium or sodium nitrate solution or any combination thereof.

3. The process according to claim 1, wherein the phosphorous source is an aqueous phosphoric acid solution.

4. The process according to claim 2, wherein the process comprises the step of automatically adjusting the dosage of the nutrients solution added to the wastewater stream in relation to the sulphur compound content in the sulphur compounds contaminated wastewater stream at an inlet of the granular sludge treatment system.

5. The process according to claim 1, wherein the sulphur compounds comprise hydrogen sulphide.

6. The process according to claim 1, wherein the wastewater stream is an industrial wastewater stream.

7. Granular sludge treatment system (10) arranged to reduce the amount of sulphur compounds in a sulphur compounds contaminated wastewater stream, the granular sludge treatment system (10) comprising anaerobic microorganisms capable of oxidizing the sulphur compounds, these anaerobic microorganisms being arranged to be contacted with the sulphur compounds and being arranged to oxidize at least part of the sulphur compounds in the sulphur compounds contaminated wastewater stream, resulting in a sulphur compounds depleted wastewater stream, CHARACTERIZED IN THAT the granular sludge treatment system comprises a dosage system (6) for adding an aqueous nitrate solution to the sulphur compounds contaminated wastewater stream before being contacted with the anaerobic microorganisms, enabling the anaerobic microorganisms to oxidize the sulphur compounds without the presence of oxygen.

8. Granular sludge treatment system (10) according to claim 7, wherein the granular sludge treatment system (10) comprises a controller (5) that is arranged to monitor one or more signals from loads of sulphur compounds at an inlet (1) of a granular sludge reactor (11) forming part of the granular sludge treatment system (10);

calculate the demand of the nitrogen and/or the phosphor source in the nutrient solution for the anaerobic microorganisms; and adjust the dosage of the nitrogen and/or the phosphor source in the nutrient solution based on the demand of the nitrogen and/or the phosphor source equaling to a ratio of sulphur compound, nitrogen and phosphor source of 20:10:1 based on weight.

9. Granular sludge treatment system (10) according to claim 8, wherein the controller (5) is arranged to simultaneously adapt the dosage of the nitrogen and the phosphor source in the nutrient solution.

10. Granular sludge treatment system (10) according to claim 9, wherein the controller (5) is arranged to adapt the dosage of the nitrogen and the phosphor source in the nutrient solution separately.

11. Granular sludge treatment system (10) according to claim 7, wherein the system (10) comprises a supersonic probe (7) arranged to measure the flow volume stream at the inlet (1) of the granular sludge reactor (11).

12. Granular sludge treatment system (10) according to claim 7, wherein the system (10) comprises a headspace (3) arranged to allow the produced off-gas to leave the granular sludge reactor (11).

13. Use of a granular sludge treatment system (10) according to claim 7 for reducing the amount of sulphur compounds in a sulphur compounds contaminated wastewater stream.

\* \* \* \* \*